United States Patent
Kim et al.

(10) Patent No.: US 11,405,787 B2
(45) Date of Patent: Aug. 2, 2022

(54) PHYSICAL SIGNAL OVERSHADOWING ATTACK METHOD FOR LTE BROADCAST MESSAGE AND THE SYSTEM THEREOF

(71) Applicant: Korea Advanced Institute of Science and Technology, Daejeon (KR)

(72) Inventors: Yongdae Kim, Daejeon (KR); Hojoon Yang, Daejeon (KR); Sangwook Bae, Daejeon (KR); Mincheol Son, Daejeon (KR); Hongil Kim, Daejeon (KR); Song Min Kim, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 98 days.

(21) Appl. No.: 17/124,634

(22) Filed: Dec. 17, 2020

(65) Prior Publication Data
US 2021/0185537 A1   Jun. 17, 2021

(30) Foreign Application Priority Data

Dec. 17, 2019   (KR) .................. 10-2019-0168502
Dec. 15, 2020   (KR) .................. 10-2020-0175251

(51) Int. Cl.
*H04W 12/122*   (2021.01)
*H04W 12/106*   (2021.01)
(Continued)

(52) U.S. Cl.
CPC ....... *H04W 12/122* (2021.01); *H04L 63/1466* (2013.01); *H04W 12/106* (2021.01); *H04W 56/001* (2013.01); *H04W 72/042* (2013.01)

(58) Field of Classification Search
CPC . H04L 63/1466; H04L 5/0044; H04L 5/0053; H04L 5/0091; H04W 12/106;
(Continued)

(56) References Cited

U.S. PATENT DOCUMENTS

2021/0058792 A1*   2/2021   Bhushan .................. H04K 1/06
2021/0067972 A1*   3/2021   McGrath ................. H04W 4/90

OTHER PUBLICATIONS

Yang et al., "Hiding in Plain Signal: Physical Signal Overshadowing Attack on LTE", Proceedings of the 28th USENIX Security Symposium, Aug. 2019, 19 pages.
(Continued)

*Primary Examiner* — Kabir A Timory
(74) *Attorney, Agent, or Firm* — Leber IP Law; David C. Robertson

(57) ABSTRACT

A physical signal overshadowing attack method for an LTE broadcast message and a system thereof are provided. The method includes identifying physical configuration information of user equipment (UE) which is an attack target and manipulating a physical downlink shared channel (PDSCH), a physical downlink control channel (PDCCH), and a physical control format indicator channel (PCFICH) for subframes of the LTE broadcast message transmitted to the UE to form a subframe for attack, synchronizing a time domain and a frequency domain of the subframe for attack depending on the LTE broadcast message, and injecting the synchronized subframe for attack into legitimate subframes of the LTE broadcast message transmitted to the UE and transmitting the injected subframes.

15 Claims, 11 Drawing Sheets

(51) Int. Cl.
*H04L 9/40* (2022.01)
*H04W 56/00* (2009.01)
*H04W 72/04* (2009.01)

(58) Field of Classification Search
CPC .. H04W 56/001; H04W 72/042; H04W 80/02
See application file for complete search history.

(56) References Cited

OTHER PUBLICATIONS

Hussain et al., "LTEInspector: A Systematic Approach for Adversarial Testing of 4G LTE", Network and Distributed Systems Security (NDSS) Symposium 2018, Feb. 2018, 15 pages.

* cited by examiner

FIG. 10A

SIB 2
  ac-BarringInfo
    ...1 ....ac-BarringForEmergency: False

FIG. 10B

SIB2
  ac-BarringInfo
    ...1 ....ac-BarringForEmergency: True
    ac-BarringForMO-Signalling
        | ac-BarringFactor: p00 |
        | ac-BarringTime: s512 |
       ac-BarringForSpecialAC: '11111'B
    ac-BarringForMO-Data
        | ac-BarringFactor: p00 |
        | ac-BarringTime: s512 |
       ac-BarringForSpecialAC: '11111'B
         ⋮ ac-BarringSkipForMMTELVoice-r12: True

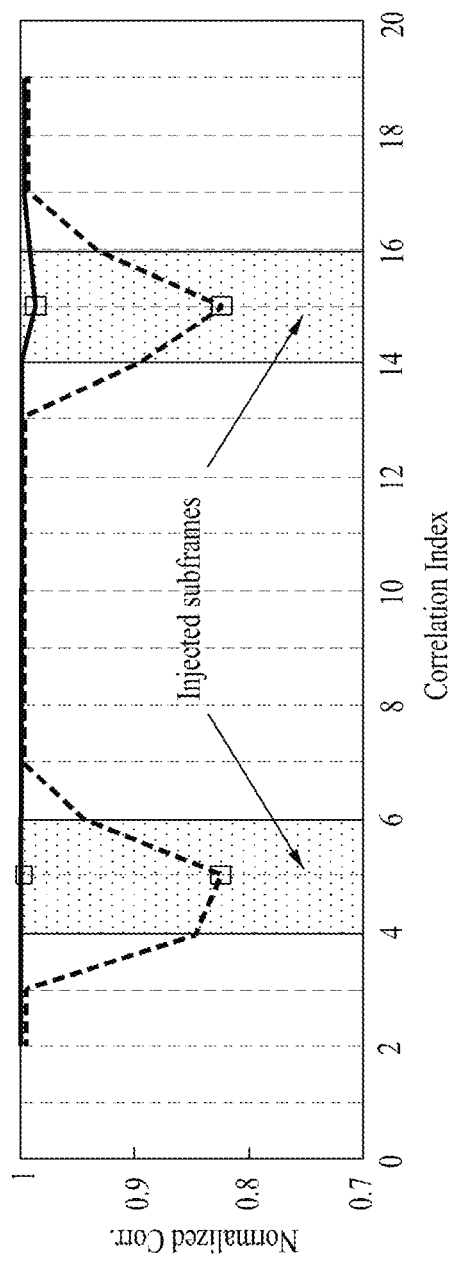

PHYSICAL SIGNAL OVERSHADOWING ATTACK METHOD FOR LTE BROADCAST MESSAGE AND THE SYSTEM THEREOF

CROSS-REFERENCE TO RELATED APPLICATIONS

A claim for priority under 35 U.S.C. § 119 is made to Korean Patent Application No. 10-2019-0168502 filed on Dec. 17, 2019 and No. 10-2020-0175251 filed on Dec. 15, 2020 in the Korean Intellectual Property Office.

BACKGROUND

Embodiments of the inventive concept described herein relate to a physical signal overshadowing attack method for a long term evolution (LTE) broadcast message and a system thereof, and more particularly, relate to an overshadowing attack injecting a manipulated broadcast signal into user equipment (UE) which is an attack target.

A long term evolution (LTE) technology transmits essential information to a user device (hereinafter referred to as "user equipment (UE)") over a cellular network using a broadcast signal. Information broadcast from an LTE base station, that is, an evolved node B (eNB) includes synchronization information necessary for the UE to access the cellular network and a radio resource configuration. Based on the received broadcast signal, the UE performs an authentication and key agreement (AKA) procedure to perform registration with the network and monitors the broadcast signal for various purposes after the registration. For example, when the UE is not connected with the eNB due to its inactivation, it should regularly identify a paging message. Although the UE is actively connected with the eNB, it continues listening to a broadcast signal to update it and determine a change in the entire configuration of the system and identifies that an intended message arrives at a plurality of UEs.

Most LTE signal messages are protected from correction using encryption primitive, but integrity protection is not performed in an LTE broadcast message. Thus, in spite of various practical applications, the broadcast signal is not secured. In LTE, communication between the UE and the network is ensured only after an authentication and security handshake procedure is successfully performed which is a non-access stratum (NAS) and access stratum (AS) security mode produce for unicast message protection. At this time, the unprotected broadcast signal exposes the system and the UE due to a variety of vulnerability.

In an existing technology, an attack using the unprotected broadcast signal is announced. In general, such an attack uses a fake base station (FBS) which transmits a stronger signal than a legitimate base station and lures the UE into being connected to itself. The attack has an undesirable influence on the UE by mainly using the paging message and involves a remarkable characteristic capable of identifying the presence of the FBS, for example, a result such as a high signal power and a denial of service.

SUMMARY

Embodiments of the inventive concept provide an overshadowing attack which is a signal injection attack of manipulating a signal transmitted from the air using a fundamental weakness of the broadcast message in LTE without using a fake base station (FBS).

According to an exemplary embodiment, a physical signal overshadowing attack method for an LTE broadcast signal may include identifying physical configuration information of user equipment (UE) which is an attack target and manipulating a physical downlink shared channel (PDSCH), a physical downlink control channel (PDCCH), and a physical control format indicator channel (PCFICH) for subframes of the LTE broadcast message transmitted to the UE to form a subframe for attack, synchronizing a time domain of the subframe for attack with a frequency domain of the subframe for attack depending on the LTE broadcast message, and injecting the synchronized subframe for attack into legitimate subframes of the LTE broadcast message transmitted to the UE and transmitting the injected subframes.

According to an exemplary embodiment, a physical signal overshadowing attack system for an LTE broadcast signal may include a subframe processing unit that identifies physical configuration information of a UE which is an attack target and manipulates a physical downlink shared channel (PDSCH), a physical downlink control channel (PDCCH), and a physical control format indicator channel (PCFICH) for subframes of the LTE broadcast message transmitted to the UE to form a subframe for attack, a synchronization unit that synchronizes a time domain of the subframe for attack with a frequency domain of the subframe for attack depending on the LTE broadcast message, and a transmission unit that injects the synchronized subframe for attack into legitimate subframes of the LTE broadcast message transmitted to the UE and transmits the injected subframes.

According to an exemplary embodiment, a physical signal overshadowing attack method for an LTE broadcast signal may include identifying physical configuration information of a UE which is an attack target and determining a structure of a subframe for attack, manipulating a physical downlink shared channel (PDSCH), a physical downlink control channel (PDCCH), and a physical control format indicator channel (PCFICH) for subframes of the LTE broadcast message transmitted to the UE to form the subframe for attack, synchronizing a time domain of the subframe for attack with a frequency domain of the subframe for attack depending on the LTE broadcast message, and injecting the synchronized subframe for attack into legitimate subframes of the LTE broadcast message transmitted to the UE and transmitting the injected subframes.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 10A and 10B illustrate an example of an access control function of an SIB2 message according to an embodiment of the inventive concept;

FIGS. 11A, 11B, and 11C illustrate a test result of a fluctuation in channel estimation size after an overshadowing attack according to an embodiment of the inventive concept.

DETAILED DESCRIPTION

Figure 1:
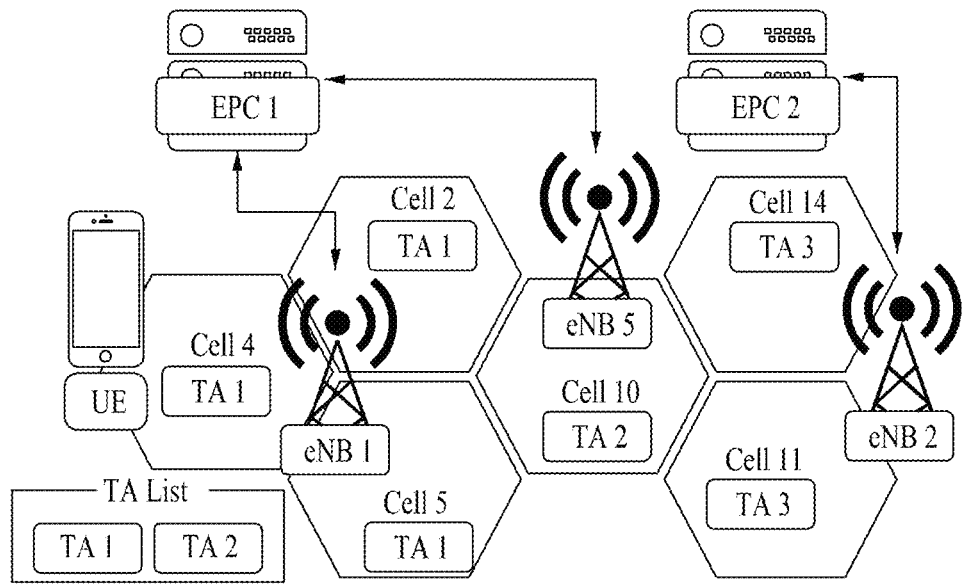
FIG. 1 illustrates a configuration of an LTE network.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided so that this disclosure will be through and complete and will fully convey the concept of the invention to those skilled in the art, and the inventive concept will only be defined by the scope of the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of stated components, steps, operations, and/or elements, but do not exclude presence or addition of one or more other components, steps, operations, and/or elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, exemplary embodiments of the inventive concept will be described in detail with reference to the accompanying drawings. The same reference denotations are used for the same components on the drawings, and a duplicated description of the same components will be omitted.

An embodiment of the inventive concept may propose an overshadowing (SigOver) attack injecting a manipulated broadcast signal into user equipment (UE) without adopting a fake base station (FBS).

The SigOver attack may be overwrite a portion of a legitimate signal using a manipulated attack signal and may be based on the fact that the UE decodes a stronger signal when receiving several overlapped signals at the same time. This is called a capture effect. An important technical component of the attack may be to synchronize a timing of an attack signal with a timing of a targeted legitimate signal such that the UE decodes only the attack signal. Because the attack signal transmitted in a considerable low power level overshadows a target signal and because other signals/messages between the UE and a network remain, a covert attack is possible. Thus, because the attack signal is able to have an influence on a plurality of nearby UEs at a low signal and at a low calculation cost, an embodiment of the inventive concept may have a great influence on the plurality of nearby UEs. It is noted that the SigOver attack does not need to perform any active communication with the UE and does not relay a message between the UE and an evolved Node B (eNB).

The SigOver attack may be to commercialize a signal overshadowing attack for an LTE broadcast signal for the first time using a low-cost software defined radio (SDR) platform and an open source LTE library. The SigOver attack may be commercialized by addressing a problem such as time and frequency synchronization. When overshadowing a legitimate signal using a malicious signal, the SigOver attack may need to perform time synchronization with a downlink physical channel of the eNB, which is received by the UE which is an attack target. Thus, an embodiment of the inventive concept may use a synchronization signal of the eNB, which is transmitted periodically at intervals of a certain time to accomplish time synchronization and may use a GPS disciplined oscillator (GPSDO) for frequency synchronization.

Hereinafter, an embodiment of the inventive concept will be described in detail with reference to FIGS. 1 to 12.

FIG. 1 illustrates a configuration of an LTE network.

As shown in FIG. 1, the LTE network may be composed of use equipment (UE), an evolved Node B (eNB), and an evolved packet core (EPC).

The UE may be a final device which provides a subscribed user with an LTE service with voice and data services. The UE may include a smart card called a universal subscriber identity module (USIM) which stores a permanent ID (e.g., an international mobile subscriber ID or an International mobile subscriber identity (IMSI)) or a temporary ID (e.g., a globally unique temporary identity (GUTI)) for user identification and an encryption key for encryption and integrity protection.

The eNB may be an LTE base station, which may provide a wireless connection for the UE to receive a service enabled in the LTE network. In this case, a single eNB may include several sites (referred to as cells in LTE) identified by a physical-layer cell identity (PCI).

An EPC network may take charge of authentication, mobility, session management, and a control function such as a user plane service. A mobility management entity (MME) of the EPC network may manage a tracking area (TA) set for mobility management, and several eNBs may be included in each area.

Figure 2:
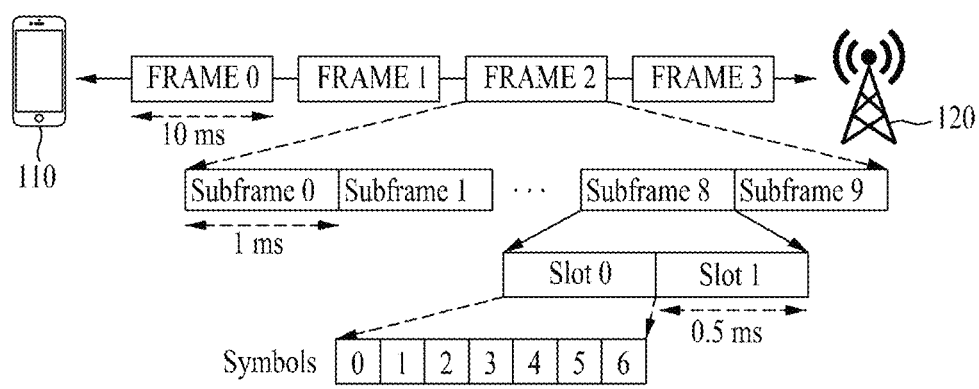
FIG. 2 illustrates an LTE frame structure.

FIG. 2 illustrates an LTE frame structure.

Referring to FIG. 2, a UE 110 and an eNB 120 may communicate with each other based on the same wireless frame structure. Each frame may have a duration of 10 ms and may be composed of 10 subframes, each of which has a duration of 1 ms. The single subframe may be additionally divided into two slots, each of which has the same duration, and each sot may be composed of 7 orthogonal frequency division multiplexing (OFDM) symbols.

In LTE, radio resources may be allocated in units of physical resource blocks (PRBs) including 12 subcarriers (each having a bandwidth of 15 KHz) and may consume one slot in a time (e.g., 0.5 ms). The number of PRBs available in a frequency band may be determined by a system bandwidth, and the eNB 120 may allocate a PRB in a subframe (1 ms) which is a minimum reservation time interval.

When a signal moves over a radio channel, it may be distorted due to some factors such as attenuation, phase deviation, and noise. To accept such factors, a wireless device may estimate a channel using Y(k)=H(k)X(k). Herein, Y(k), H(k), and X(k) denote the signal received by the UE 110, the channel coefficient, and the signal transmitted by the eNB 120, respectively. In the LTE, the UE 110 may perform channel estimation based on a reference signal (RS) transmitted by the eNB 120. Because the UE 110 already knows values of X(k) and Y(k) of the RS, it may calculate H(k) in $$H(k) = \frac{Y(k)}{X(k)}.$$

In addition, H(k) of the RS may be averaged using an averaging window to minimize an influence of noise in the channel estimation.

When the UE 110 is turned on, it should find a suitable cell for establishing a wireless connection. To this end, the UE 110 may first attempt to measure a received signal strength indication (RSSI) of a candidate frequency channel. The UE 110 may select a channel having the highest RSSI based on the measurement and may listen to a primary synchronization signal (PSS) and a secondary synchronization signal (SSS) to obtain time synchronization based on subframes and for a physical-layer cell ID (PCI) of a cell. The UE 110 may decode a master information block (MIB) to obtain a system frame number (SFN) and other physical channels.

After completing the cell search procedure, the UE 110 may decode a physical control format indicator channel (PCFICH) and a physical downlink control channel (PDCCH) to decode downlink data. At this time, the UE 110 may know the number of OFDM symbols used to convey the PDCCH in each subframe over the PCFICH. The UE 110 may decode the PDCCH including data required by the UE 110 and information about a resource block for a demodulation system. After decoding the two channels, the UE 110 may decode another system information broadcast over a physical downlink shared channel (PDSCH). Herein, there may be 22 system information blocks (SIBs) and different cell related system information may be included in each block. SIB1 and SIB2 among them are mandatory for the UE 110 to connect to a cell, and availability of another SIB is specified in SIB1.

In addition, the UE 110 may perform a random access channel (RACH) procedure to establish a wireless connection with the eNB 120. To this end, the UE 110 may randomly select a random access (RA) preamble sequence and may transmit it the eNB 120. Unless the same preamble sequence is transmitted to another UE at the same time, the UE 110 may successfully complete the RA procedure.

Figure 3:
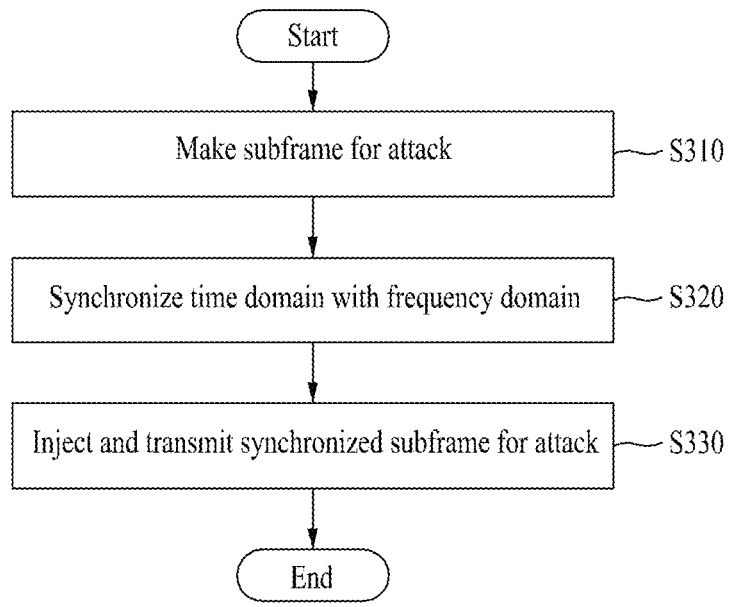
FIG. 3 illustrates an operational flowchart of an overshadowing attack method according to an embodiment of the inventive concept.
Figure 4:
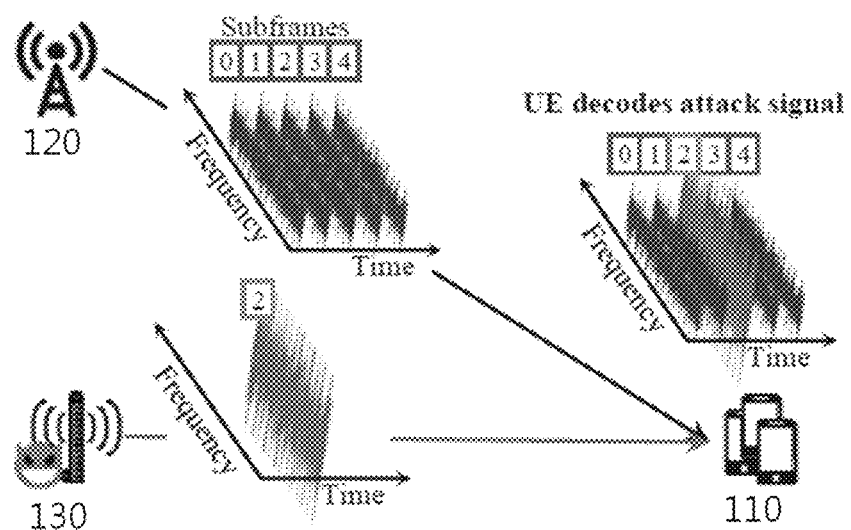
FIG. 4 illustrates an overshadowing attack according to an embodiment of the inventive concept.
Figure 5:
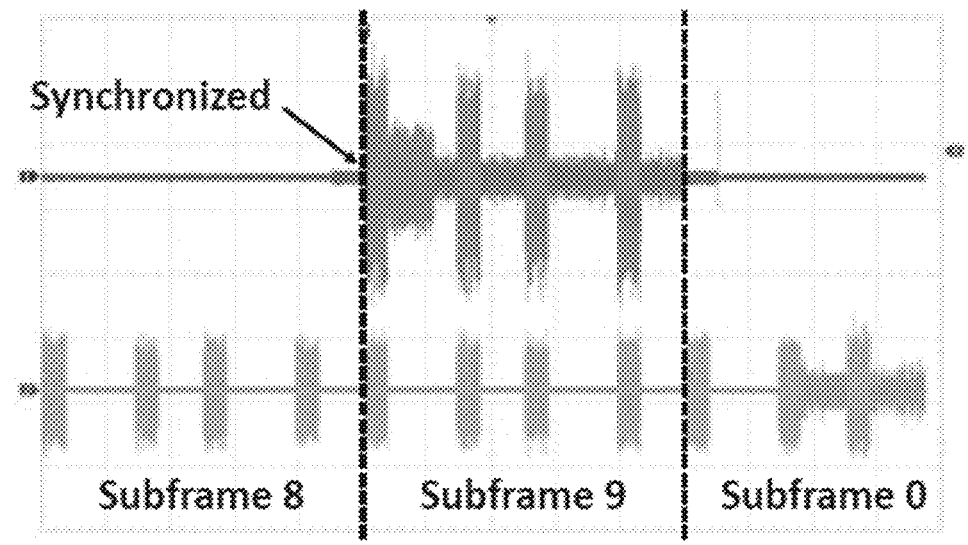
FIG. 5 illustrates a result graph for time synchronization according to an embodiment of the inventive concept.
Figure 6:
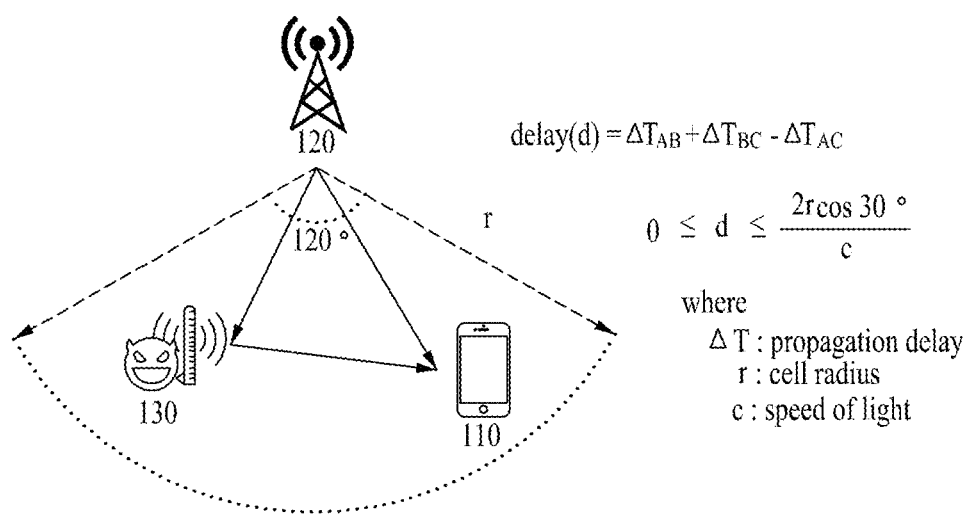
FIG. 6 illustrates an example of a propagation delay according to locations of a UE and an attacker according to an embodiment of the inventive concept.

FIG. 3 illustrates an operational flowchart of an overshadowing attack method according to an embodiment of the inventive concept. Furthermore, FIG. 4 illustrates an overshadowing attack according to an embodiment of the inventive concept. FIG. 5 illustrates a result graph for time synchronization according to an embodiment of the inventive concept. FIG. 6 illustrates an example of a propagation delay according to locations of a UE and an attacker according to an embodiment of the inventive concept.

Figure 12:
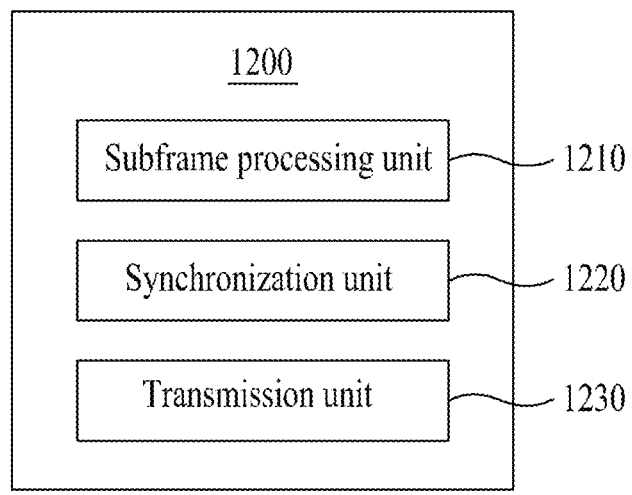
FIG. 12 is a block diagram illustrating a detailed configuration of an overshadowing attack system according to an embodiment of the inventive concept.

The method of FIG. 3 may be performed by an overshadowing attack system of FIG. 12.

An active attacker 130 having minimum authority may attack a UE 110 using an overshadowing attack method according to an embodiment of the inventive concept. At this time, the attacker 130 does not know an LTE key of the UE 110 which is an attack target. Furthermore, the attacker 130 may overhear a downlink broadcast message transmitted from a legitimate LTE cell to the UE 110 or may not decode a cipher of an encrypted message because it is impossible to use an attack target key. Thus, the active attacker 130 using the overshadowing attack method according to an embodiment of the inventive concept may inject a malicious message into the UE 110 which is the attack target while overwriting a legitimate message.

A description will be given in detail of the overshadowing attack method according to an embodiment of the inventive concept with reference to FIG. 3. In operation S310, physical configuration information of a UE which is an attack target may be identified, and a physical downlink shared channel (PDSCH), a physical downlink control channel (PDCCH), and a physical control format indicator channel (PCFICH) for subframes of an LTE broadcast message transmitted to the UE may be manipulated to form a subframe for attack.

According to an embodiment of the inventive concept, a subframe capable of being successfully decoded by the UE which is the attack target may be made. In operation S310 may be to first identify a physical configuration of a legitimate cell on which the UE which is the attack target camps to determine a structure of the subframe for attack. The physical configuration information necessary for valid subframe configuration may include at least one or more of a physical-layer cell ID (PCI), a channel bandwidth, a physical hybridARQ indicator channel (PHICH), and a transmission scheme (or the number of antenna ports). The physical configuration information may be accepted in the same legitimate cell by the attacker to be used by the attacker. Particularly, the PCI may be calculated from the PSS/SSS, and the channel bandwidth, the PHICH, and the transmission scheme may be obtained from a master information block (MIB). In addition, the attacker should be synchronized with a system frame number (SFN) of the legitimate cell available in the MIB to determine a time when the subframe for attack is injected.

In the LTE, when reading an LTE broadcast message, the UE may decode a control format indicator (CFI) including a control channel structure, downlink control information (DCI) including a resource (i.e. a resource block) allocated to the message, and a resource block (RB) including the message itself, from the subframes. Thus, in operation S310 may be to manipulate subframes of the PDSCH, the PDCCH, and the PCFICH including each information of the CFI, the DCI, and the RB, which are decoded by the UE, to make the subframe for attack. At this time, the CFI and the DCI may be transmitted over the PCFICH and the PDCCH, and the message may be transmitted over the PDSCH.

The subframes including the above-mentioned values may fail to be correctly decoded by the UE due to a channel estimation error. The UE may estimate a channel from a reference signal (RS) transmitted by a legitimate eNB, but the estimated result may be unsuitable to accurately decode the injected subframe. Thus, S310 according to an embodiment of the inventive concept may be to include the RS in the subframe for attack, thus improving the robustness of the overshadowing attack.

A final technical problem associated with decoding the manipulated subframe for attack may be to recover the manipulated subframe for attack from signal distortion due to a channel in conjunction with wireless channel estimation and equalization. A channel in the overshadowing (SigOver) attack according to an embodiment of the inventive concept may be estimated to be superior (according to only a paging situation) in the manipulated subframe from attack, or may be averaged in consecutive subframes (RRC connected) together with several legitimate subframes. In the former case, it is suitable to perform only one injection for an attack (i.e., decoding the manipulated subframe for attack). In the latter case, repeated injection may be needed to effectively reflect a wireless channel between an attacker and a UE. Thus, according to the result of measuring the injection of a subframe into all SFNs one by one, the overshadowing (SigOver) attack maintaining reliable communication for legitimate subframes according to an embodiment of the inventive concept may accomplish a success rate of 98% or more in a time of less than one second.

In operation S320, a time domain of the subframe for attack may be synchronized with a frequency domain of the subframe for attack according to the LTE broadcast message.

Because the overshadowing attack according to an embodiment of the inventive concept causes the manipulated subframe to be accurately overlapped with a legitimate signal in both the time domain and the frequency domain, there may be a need for synchronization between the time domain and the frequency domain of the subframe for attack. Thus, operation S320 may be to perform time synchronization using a synchronization signal of the eNB, which is periodically transmitted at intervals of a certain time, and perform frequency synchronization using a GPS disciplined oscillator (GPSDO).

For the time synchronization, operation S320 may be to obtain subframe timing from the synchronization signal and synchronize an SFN available in a master information block (MIB) of a legitimate cell of the UE to determine a time when the subframe for attack is injected. To accurately overshadow legitimate subframes, the attacker should know subframe timing for determining a subframe start time from a legitimate cell and an SFN for determining a time to inject a subframe in conjunction with a frame number.

Thus, operation S320 according to an embodiment of the inventive concept may be to obtain subframe timing of the synchronization signal (e.g., a PSS/SSS) and obtain an SNF from the MIB of the legitimate cell. At this time, because a value varies over time by a channel state, operation S320 may be to continue obtaining subframe timing and an updated SFN.

Thus, as shown in FIG. 5, the overshadowing attack method according to an embodiment of the inventive concept may obtain the subframe timing and the SFN, thus precisely synchronizing a transmission time of the subframe for attack with a transmission time of the LTE broadcast message.

Herein, as shown in FIG. 6, the subframe for attack transmitted at the obtained subframe timing may have a little timing offset due to a propagation delay (in conjunction with legitimate subframes) to arrive at the UE 110. Although it is unable to avoid the delay d (because it is unable for the attacker 130 to understand the propagation delay), the influence thereof is small, and this is because a baseband processor of the UE 110 is designed to compensate a delay due to mobility and an environment influence. Because a correctable maximum delay depends on the baseband processor of the UE 110, an embodiment of the inventive concept performs the following experiment to measure the delay. In an embodiment of the inventive concept, assuming that there is a typical 3-sector cell configuration where a transmission angle of a cell is 120 degrees, it is verified that the delay d is maximized when the attacker 130 and the UE 110 are located at both ends of a call. It is interpreted that d=8.66 μs in a typical cell radius of about 1.5 km in an urban environment. Thus, an allowable offset error is measured in two devices with different basebands (Qualcomm and Exynos). It is verified that the allowable error is greater than a maximum delay (i.e., 8.66 μs).

Referring again to FIG. 3, in the overshadowing attack method according to an embodiment of the inventive concept, for the frequency synchronization, operation S320 may be to keep a carrier frequency offset under a corresponding level in the UE and determine an operating frequency of the subframe for attack using the GPSDO.

An operating frequency of a wireless device is determined by an oscillator. The oscillator has inevitably difficulty by an offset for each device, which is generated during its operation due to an environmental influence (e.g., temperature). Such imperfection of the oscillator is reflected as a carrier frequency offset in a wireless signal. Thus, an embodiment of the inventive concept may always keep an offset under the corresponding level in the UE for reliable implementation of the overshadowing attack.

An LTE standard defines the accuracy of a base station minimum frequency of ±50 ppb for macro base station. To meet the requirements, an eNB may have a very accurate oscillator, a precision time protocol, and an additional augmentation technology such as a GPS. Thus, the overshadowing attack method according to an embodiment of the inventive concept may be to use a GPSDO, that is, an oven-controlled crystal oscillator (OCXO), to reduce a frequency offset to a suitable level. The GPSDO may provide sufficient accuracy of ±25 ppb and may be very stable (±1 ppb when the GPS is locked). This indicates a maximum of a frequency offset of ±270 Hz (at 3.6 GHz where the offset is 75 ppb).

In operation S330, the synchronized subframe for attack may be injected into legitimate subframes of the LTE broadcast message transmitted to the UE to be transmitted.

An LTE downlink may be scheduled to be subdivided into subframes during a period of 1 ms. Each subframe may be separately encoded by the eNB and may be decoded by the UE. Referring to FIG. 4, in a frame structure, the attacker 130 may perform an attack of accurately overshadowing legitimate subframes (blue) transmitted from the eNB 120, that is, injecting a manipulated subframe (brown) for attack and transmitting the injected subframes to the UE 110. As such, the overshadowing attack method according to an embodiment of the inventive concept may be to inject an orange subframe for attack, which is synchronized in time and frequency, into the blue legitimate subframes and transmit the injected subframes to the UE in operation S330.

Because the subframes are independently decoded, the legitimate subframes are generally not affected. On the other hand, the injected subframe for attack may be designed to operate a UE which receives and decodes subframes based on information included therein and may be used to generally cause an abnormal or malicious operation, that is, an action intended by an attacker. Inherent vulnerability of the LTE broadcast message may allow the attacker to initiate various types of attacks using a legitimate-sounding message (i.e., trickily).

Figure 7A:
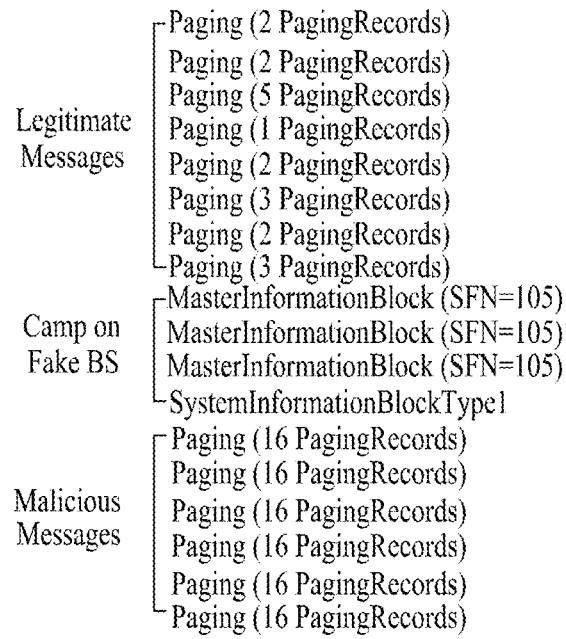
FIGS. 7A and 7B illustrate signal messages of an overshadowing attack and a fake base station (FBS) attack according to an embodiment of the inventive concept.
Figure 7B:
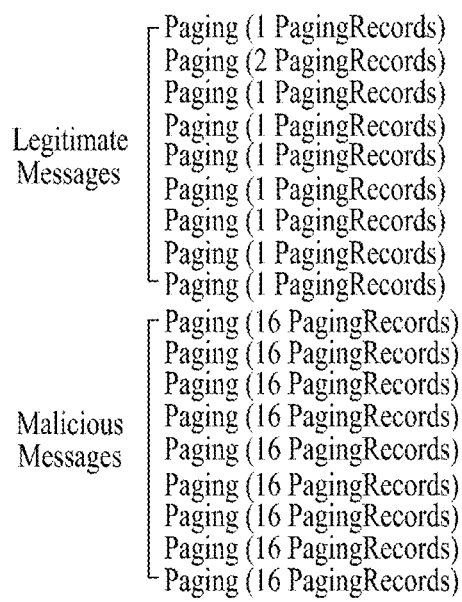

FIGS. 7A and 7B illustrate signal messages of an overshadowing attack and a fake base station (FBS) attack according to an embodiment of the inventive concept.

In detail, FIG. 7A illustrates a signal message of an FBS attack and FIG. 7B illustrates a signal message of an overshadowing attack according to an embodiment of the inventive concept.

The FBS attack may be one of the most commonly used attacks for a cellular network. In the FBS attack, an attacker (i.e., an FBS) may transmit a signal stronger than a legitimate cell to camp on a UE which is an attack target. Next, the attacker may inject an unprotected, legitimate-sounding message into the UE. Such an FBS attack has the following limit as compared with the overshadowing attack.

In general, because the UE selects a cell which transmits a signal at the highest power, the FBS should transmit a signal at high power to the UE. Furthermore, when the UE which is an attack target is accommodated in the FBS, it may not receive a service by means of the FBS.

Furthermore, in general, the FBS may be configured to be disguised as a legitimate BS. For example, the FBS may broadcast the same MIB and SIB1/2 message as a message of the legitimate cell and may use the same PCI not to be distinguished from a legitimate thing. Nevertheless, the FBS may have some signatures for detection. First, as discussed above, the FBS attack uses 1,000 times more power than the legitimate cell which is a clear index of the FBS (about two times of the overshadowing attack). Secondly, when the FBS lures the UE camping on the legitimate cell, a victim should pass through a cell reselection process. Herein, the UE which is the attack target reads, as shown in FIG. 7A, an MIB and an SIB1/2 message from the FBS. Thirdly, because the operation of the FBS has limited physical capability compared to a real BS, it may greatly differ from legitimate operation. Such an operation characteristic may include a relatively low paging speed in addition to different radio frequency (RF) attributes, such as a high frequency offset, due to low-cost hardware. Lastly, the FBS may not configure a security connection with the UE or may not transmit a transmission protection non access stratum (NAS) message between the UE and a network (i.e., an MME), and this causes a denial of service to the UE. Thus, there is a very high possibility that the UE may detect the FBS. Meanwhile, the mechanism of the overshadowing attack may be to precisely overshadow a specific broadcast message without interfering with synchronization between the UE, which is the attack target, and a current cell. Thus, as shown in FIG. 7B, the UE may not perform cell reselection or may not reconfigure a cell unique parameter. Thus, the UE under the overshadowing attack may maintain a security signal connection with the legitimate eNB and the mobility management entity (MME).

Figure 8A:
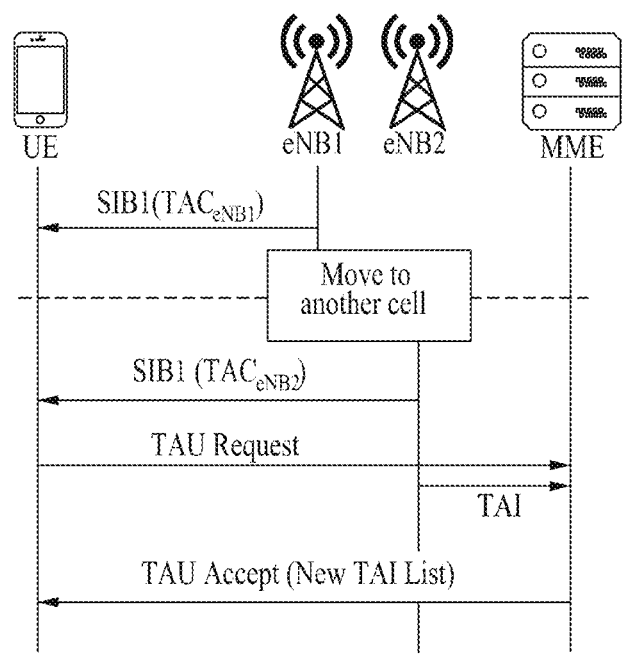
FIGS. 8A and 8B illustrate general and attack examples for a tracking area update (TAU) procedure according to an embodiment of the inventive concept.
Figure 8B:
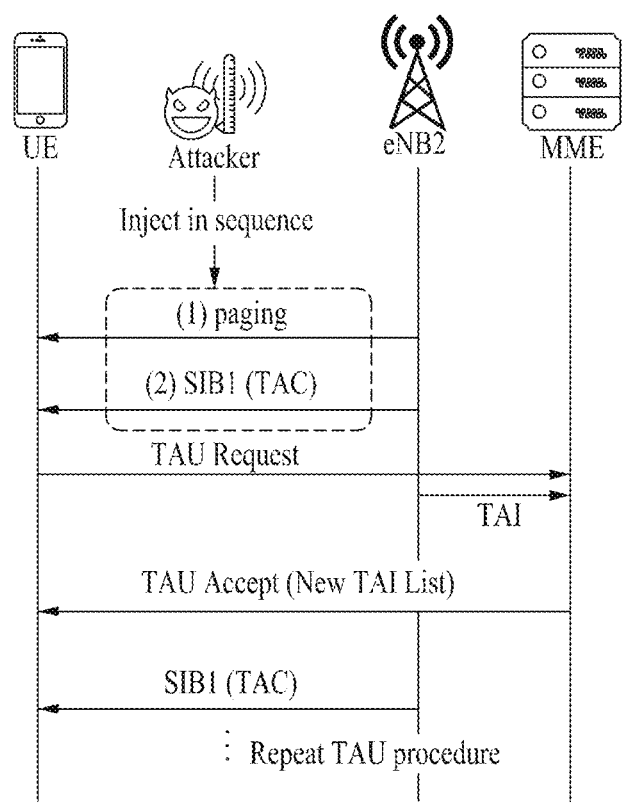
Figure 9:
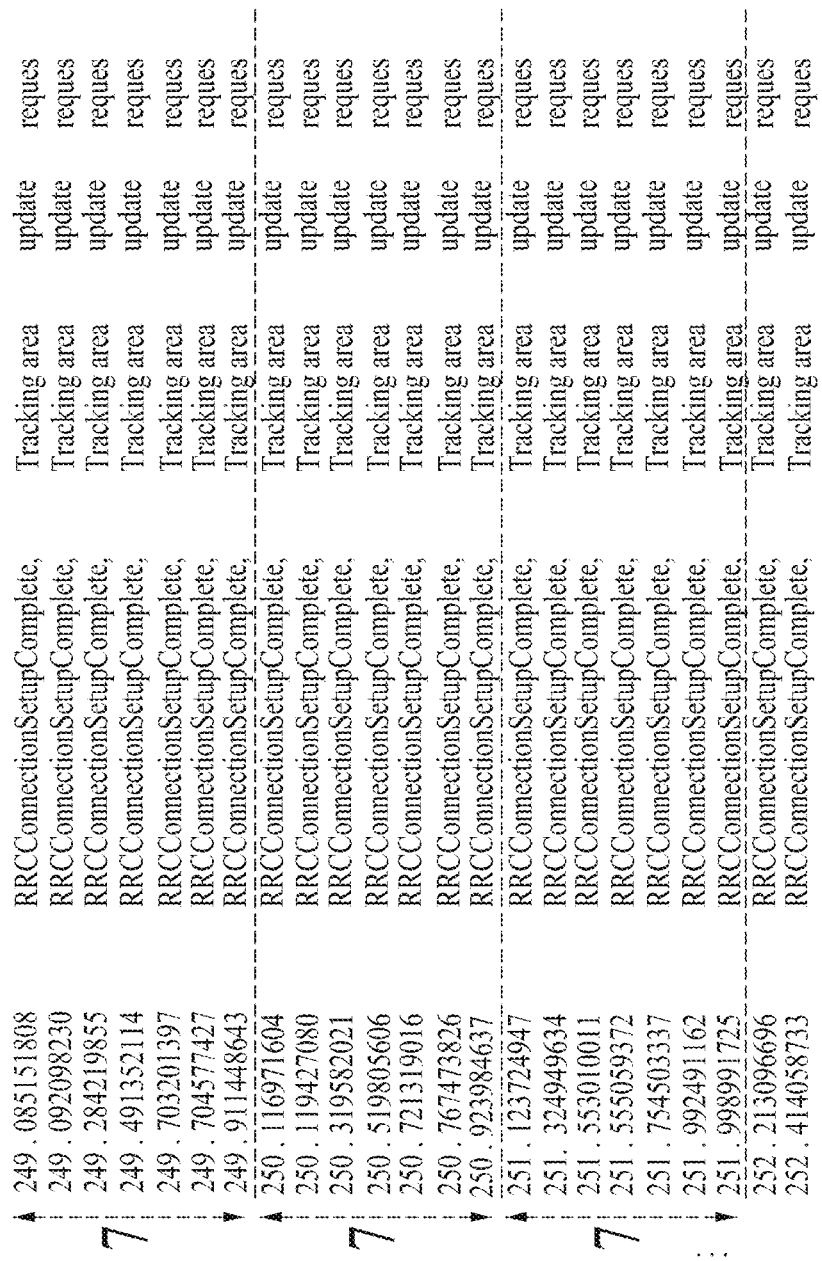
FIG. 9 illustrates an example of a tracking area update (TAU) request message generated by SIB1 spoofing according to an embodiment of the inventive concept.

FIGS. 8A and 8B illustrate general and attack examples for a tracking area update (TAU) procedure according to an embodiment of the inventive concept. FIG. 9 illustrates an example of a TAU request message generated by SIB1 spoofing according to an embodiment of the inventive concept.

In detail, FIG. 8A illustrates a general TAU procedure and FIG. 8B illustrates a TAU procedure upon an overshadowing attack according to an embodiment of the inventive concept.

When moving to a new cell, a UE may search for a tracking area code (TAC) included in SIB1 from the new cell and may verify the found TAC using a TA identity (TAI) list of the UE. When the TAC is not included in a TAC list, the UE may initiate a TAU procedure for notifying an LTE network of the updated TAC. Thus, an overshadowing (SigOver) attack may repeatedly trigger an invalid TAU to cause a signal storm.

Referring to FIGS. 8A and 8B, an attack process as compared with a general operation is represented. First of all, an attacker may overshadow a paging message, a system_Info_Modification field set of which is set to true, such that a UE reads SIB1. Thereafter, SIB1 may be overshadowed using a spoofed TAC to lead to the TAU. Because the overshadowing (SigOver) attack maintains a wireless connection between the UE and a legitimate eNB, it should be noted that a TAU request message is toward the legitimate eNB. When repeating this procedure, a signal storm occurs on an LTE network, whereas, in a normal situation, the TAU is performed only one time whenever the UE moves to another TA which is not included in the TAI list.

Referring to FIG. 9, it is shown that a single UE performs an average of seven TAU procedures per second. This procedure has no possibility to be performed in a normal condition when there is no attack. In addition, a signal message at the UE is analyzed to better understand behavior of the network by the attack. When the UE which is the attack target performs TAU to the spoofed TAC (irrespective of validity of a TAC value), the network returns the same list of the previously provided TAC during legitimate registration. In other words, a list of TACs does not still include the spoofed TAC of the UE which is the attack target. Thus, after receiving the SIB1 message from the attacker, the UE which is the attack target may repeatedly perform the TAU.

FIGS. 10A and 10B illustrate an example of an access control function of an SIB2 message according to an embodiment of the inventive concept.

In detail, FIG. 10A illustrates a default SIB2 message and FIG. 10B illustrates a malicious SIB2 message.

A cellular network may control the number of UEs capable of accessing the network. This is to manage the amount of traffic and maintain stability of the network in a specific condition such as a disaster. Control may be implemented using a BarringFactor parameter of SIB2 and may be used by an overshadowing (SigOver) attack to block the UE. When setting BarringFactor to "0" by the overshadowing attack, an attacker may limit all data traffic and a signal from the UE (i.e., a mobile device), and this may lead to DoS.

FIGS. 10A and 10B illustrate a configuration of malicious SIB2 in a manipulated subframe for attack as compared with default SIB2 of legitimate subframes.

The overshadowing (SigOver) attack may set BarringTime to the maximum value according to standards, for example, 512 seconds, to maximize the influence of the attack. Thus, when it is able to newly fix BarringTime when the attacker repeats an attack within the remaining BarringTime, it is noted that a continuous DoS may be accomplished. When wanting to suitably inject the manipulated subframe for attack (similar to a signal storm), the attacker may first overshadow a paging message using system_Info_Modification. Thereafter, the attacker may eavesdrop on legitimate SIB1 to extract an SFN and may obtain a schedule of next SIB2 for overshadowing. Potential expansion of this attack is a DoS for each service of selectively blocking only a target service (e.g., voice call, video conference, or SMS).

Figure 11A:
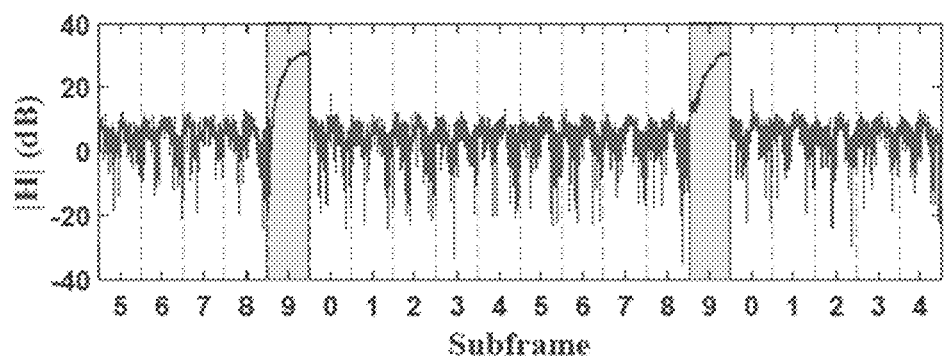
Figure 11B:
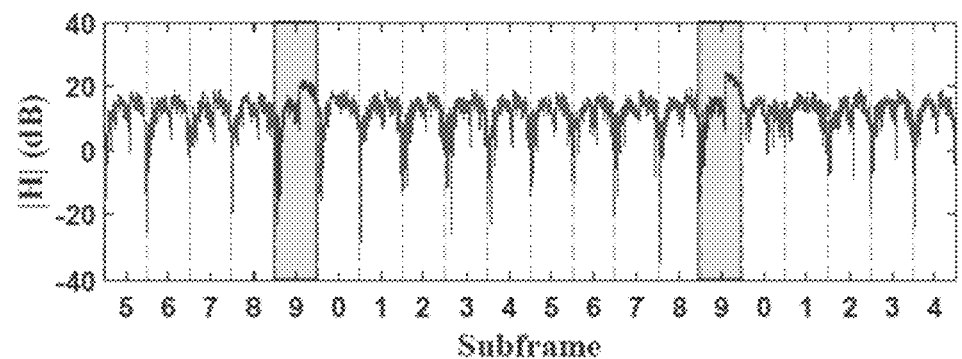

FIGS. 11A to 11C illustrate a test result of a fluctuation in channel estimation size after an overshadowing attack according to an embodiment of the inventive concept.

According to the communication theory, a wireless channel is considerably varied when moving by only ¼ of a wavelength, which is 3.57 cm for 2.1 GHz LTE. This is referred to as channel diversity. There is a high probability that it will be applied to an attacker expected to be placed on another location and a UE which is an attack target. In other words, there is a high probability that a wireless channel between the attacker and the UE will differ from a wireless channel between an eNB and the UE. Thus, injection of an attack signal reflecting the channel between the attacker and the UE may cause channel information recovered in the UE when there is only legitimate subframes (without an attack) to naturally depart. In other words, detecting such a change in the channel may function as a defense scheme.

The wireless channel may be represented as the conventionally complex expression H. The scale |H| uniquely defines different wireless channels depend on how effective signal power is transferred. Thus, a sudden change in |H| may become an effective measurement index detecting an overshadowing (SigOver) attack.

Referring to FIG. 11A, |H| of the injected subframe 9 and an legitimate signal, which are measured during the experiment, are represented in line of sight (LOS) settings where the attacker is located 2 meters away from the UE. It may be seen that heavy fluctuation in |H| is indicated when an attack occurs.

Referring to FIG. 11B, an example of detection failure in non-line of sight (NLOS) settings when a power of the injected signal is low is shown. In other words, the influence of an attack signal on H is gradually extinguished as energy is reduced and is lowered to a point where it is difficult to detect it.

Referring to FIG. 11C, unlike that in the LOS settings (a strong injection signal), this problem where a fall in correlation is unclear is clearly shown in the NLOS settings. Thus, using the channel may be a potential solution leaving the design of a robust technique as a future work.

FIG. 12 is a block diagram illustrating a detailed configuration of an overshadowing attack system according to an embodiment of the inventive concept.

Referring to FIG. 12, an overshadowing attack system 1200 according to an embodiment of the inventive concept may perform an overshadowing attack of injecting a manipulated broadcast signal into a UE which is an attack target.

To this end, the overshadowing attack system 1200 according to an embodiment of the inventive concept may include a subframe processing unit 1210, a synchronization unit 1220, and a transmission unit 1230.

The subframe processing unit 1210 may identify physical configuration information of a UE which is an attack target and may manipulate a physical downlink shared channel (PDSCH), a physical downlink control channel (PDCCH), and a physical control format indicator channel (PCFICH) for subframes of an LTE broadcast message transmitted to the UE to form a subframe for attack.

According to an embodiment of the inventive concept, a subframe capable of being successfully decoded by the UE which is the attack target may be made. The subframe processing unit 1210 should first identify a physical configuration of a legitimate cell on which the UE which is the attack target camps to determine a structure of the subframe for attack. The physical configuration information necessary for valid subframe configuration may include at least one or more of a physical-layer cell ID (PCI), a channel bandwidth, a physical hybridARQ indicator channel (PHICH), and a transmission scheme (or the number of antenna ports). The physical configuration information may be accepted in the same legitimate cell by the attacker to be used by the attacker. Particularly, the PCI may be calculated from the PSS/SSS, and the channel bandwidth, the PHICH, and the transmission scheme may be obtained from a master information block (MIB). In addition, the attacker should be synchronized with a system frame number (SFN) of the legitimate cell available in the MIB to determine a time when the subframe for attack is injected.

In the LTE, when reading the LTE broadcast message, the UE may decode a control format indicator (CFI) including a control channel structure, downlink control information (DCI) including a resource (i.e. a resource block) allocated to the message, and a resource block (RB) including the message itself, from the subframes. Thus, the subframe processing unit 1210 may manipulate subframes of the PDSCH, the PDCCH, and the PCFICH including each information of the CFI, the DCI, and the RB, which are decoded by the UE, to make the subframe for attack. At this time, the CFI and the DCI may be transmitted over the PCFICH and the PDCCH, respectively, and the message may be transmitted over the PDSCH.

The subframes including the above-mentioned values may fail to be correctly decoded by the UE due to a channel estimation error. The UE may estimate a channel from a reference signal (RS) transmitted by an legitimate eNB, but the estimated result may be unsuitable to accurately decode the injected subframe. Thus, the subframe processing unit 1210 according to an embodiment of the inventive concept may include the RS in the subframe for attack, thus improving the robustness of the overshadowing attack.

The synchronization unit 1220 may synchronize a time domain of the subframe for attack with a frequency domain of the subframe for attack depending on the LTE broadcast message.

Because the overshadowing attack according to an embodiment of the inventive concept causes the manipulated subframe to be accurately overlapped with a legitimate signal in both the time domain and the frequency domain, there may be a need for synchronization between the time domain and the frequency domain of the subframe for attack. Thus, the synchronization unit 1220 may perform time synchronization using a synchronization signal of the eNB, which is periodically transmitted at intervals of a certain time, and may perform frequency synchronization using a GPS disciplined oscillator (GPSDO).

For the time synchronization, the synchronization unit 1220 may obtain subframe timing from the synchronization signal and may synchronize a system frame number (SFN) available in a master information block (MIB) of a legitimate cell of the UE to determine a time when the subframe for attack is injected. To accurately overshadow legitimate subframes, the attacker should know subframe timing for determining a subframe start time from a legitimate cell and should know an SFN for determining a time to inject a subframe in conjunction with a frame number.

Thus, the synchronization unit 1220 according to an embodiment of the inventive concept may obtain subframe timing of the synchronization signal (e.g., a PSS/SSS) and may obtain an SNF from the MIB of the legitimate cell. At this time, because a value varies over time by a channel state, the synchronization unit 1220 may continue obtaining subframe timing and an updated SFN.

For the frequency synchronization, the synchronization unit 1220 may keep a carrier frequency offset under a corresponding level in the UE and may determine an operating frequency of the subframe for attack using the GPSDO.

The transmission unit 1230 may transmit inject the subframe for attack, which is synchronized in time and frequency, into legitimate subframes of the LTE broadcast message transmitted to the UE and may transmit the injected subframes to the UE.

It is apparent to those skilled in the art that, although the description is omitted in the system of FIG. 12, the system according to an embodiment of the inventive concept may include all details described in FIGS. 1 to 11C.

According to an embodiment of the inventive concept, as a manipulated broadcast signal may be injected into a UE which is an attack target, a high success rate of 98% may be provided in spite of a power difference of 35 dB compared to an attack using an existing fake base station (FBS).

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. A physical signal overshadowing attack method for a long term evolution (LTE) broadcast message, the method comprising:
   identifying physical configuration information of user equipment (UE) which is an attack target and manipulating a physical downlink shared channel (PDSCH), a physical downlink control channel (PDCCH), and a physical control format indicator channel (PCFICH) for subframes of the LTE broadcast message transmitted to the UE to form a subframe for attack;
   synchronizing a time domain of the subframe for attack with a frequency domain of the subframe for attack depending on the LTE broadcast message; and
   injecting the synchronized subframe for attack into legitimate subframes of the LTE broadcast message transmitted to the UE and transmitting the injected subframes.

2. The method of claim 1, wherein the forming of the subframe for attack includes:
   identifying the physical configuration information of a legitimate cell of the UE and determining a structure of the subframe for attack, and
   wherein the physical configuration information includes at least one or more of a physical-layer cell ID (PCI), a channel bandwidth, a physical hybridARQ indicator channel (PHICH), and a transmission scheme.

3. The method of claim 1, wherein the forming of the subframe for attack includes:
   manipulating subframes of the PDSCH, the PDCCH, and the PCFICH including each information of a control format indicator (CFI), downlink control information (DCI), and a resource block (RB), which are decoded by the UE, to make the subframe for attack.

4. The method of claim 3, wherein the forming of the subframe for attack includes:
   including a reference signal in the subframe for attack.

5. The method of claim 1, wherein the synchronizing includes:
   performing time synchronization using a synchronization signal of an evolved node B (eNB), the synchronization signal being periodically transmitted at intervals of a certain time, and performing frequency synchronization using a GPS disciplined oscillator (GPSDO).

6. The method of claim 5, wherein the synchronizing includes:
   obtaining subframe timing from the synchronization signal and synchronizing a system frame number (SFN) available in a master information block (MIB) of a legitimate cell of the UE to determine a time when the subframe for attack is injected.

7. The method of claim 5, wherein the synchronizing includes:
   keeping a carrier frequency offset under a corresponding level in the UE to determine an operating frequency of the subframe for attack using the GPSDO.

8. A physical signal overshadowing attack method for an LTE broadcast message, the method comprising:
   identifying physical configuration information of a UE which is an attack target and determining a structure of a subframe for attack;
   manipulating a physical downlink shared channel (PDSCH), a physical downlink control channel (PDCCH), and a physical control format indicator channel (PCFICH) for subframes of the LTE broadcast message transmitted to the UE to form the subframe for attack;
   synchronizing a time domain of the subframe for attack with a frequency domain of the subframe for attack depending on the LTE broadcast message; and
   injecting the synchronized subframe for attack into legitimate subframes of the LTE broadcast message transmitted to the UE and transmitting the injected subframes.

9. A physical signal overshadowing attack system for an LTE broadcast message, the system comprising:
   a subframe processing unit configured to identify physical configuration information of a UE which is an attack target and manipulate a physical downlink shared channel (PDSCH), a physical downlink control channel (PDCCH), and a physical control format indicator channel (PCFICH) for subframes of the LTE broadcast message transmitted to the UE to form a subframe for attack;
   a synchronization unit configured to synchronize a time domain of the subframe for attack with a frequency domain of the subframe for attack depending on the LTE broadcast message; and
   a transmission unit configured to inject the synchronized subframe for attack into legitimate subframes of the LTE broadcast message transmitted to the UE and transmit the injected subframes.

10. The system of claim 9, wherein the subframe processing unit identifies the physical configuration information of a legitimate cell of the UE and determines a structure of the subframe for attack, and
    wherein the physical configuration information includes at least one or more of a physical-layer cell ID (PCI), a channel bandwidth, a physical hybridARQ indicator channel (PHICH), and a transmission scheme.

11. The system of claim 9, wherein the subframe processing unit manipulates subframes of the PDSCH, the PDCCH, and the PCFICH including each information of a control format indicator (CFI), downlink control information (DCI), and a resource block (RB), which are decoded by the UE, to make the subframe for attack.

12. The system of claim 11, wherein the subframe processing unit includes a reference signal in the subframe for attack.

13. The system of claim 9, wherein the synchronization unit performs time synchronization using a synchronization signal of an eNB, the synchronization signal being periodically transmitted at intervals of a certain time, and performs frequency synchronization using a GPS disciplined oscillator (GPSDO).

14. The system of claim 13, wherein the synchronization unit obtains subframe timing from the synchronization signal and synchronizes a system frame number (SFN) available in a master information block (MIB) of a legitimate cell of the UE to determine a time when the subframe for attack is injected.

15. The system of claim 13, wherein the synchronization unit keeps a carrier frequency offset under a corresponding level in the UE to determine an operating frequency of the subframe for attack using the GPSDO.

* * * * *